United States Patent
Hirano et al.

(10) Patent No.: US 6,862,391 B2
(45) Date of Patent: Mar. 1, 2005

(54) OPTICAL TRANSMISSION LINE, AND OPTICAL FIBER AND DISPERSION COMPENSATING MODULE EMPLOYED IN THE SAME

(75) Inventors: Masaaki Hirano, Yokohama (JP); Akira Tada, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 320 days.

(21) Appl. No.: 10/108,257

(22) Filed: Mar. 28, 2002

(65) Prior Publication Data

US 2002/0168160 A1 Nov. 14, 2002

(30) Foreign Application Priority Data

Mar. 30, 2001 (JP) .................................. P2001-101447

(51) Int. Cl.⁷ ............................. G02B 6/02; H04J 14/02
(52) U.S. Cl. ..................... 385/123; 385/126; 385/127; 398/81
(58) Field of Search ................................ 385/123, 124, 385/126, 127, 128; 398/81

(56) References Cited

U.S. PATENT DOCUMENTS

| 5,448,674 A | 9/1995 | Vengsarkar et al. | ........ 385/123 |
| 5,684,909 A | 11/1997 | Liu | ............................. 385/127 |

(List continued on next page.)

FOREIGN PATENT DOCUMENTS

| EP | 1 072 909 A2 | 1/2001 | ............. 385/127 X |
| EP | 1 083 446 A1 | 3/2001 | ............. 385/123 X |
| EP | 1 271 193 A1 | 1/2003 | ............. 385/123 X |
| JP | 6-11620 | 1/1994 | ............. 385/123 X |
| JP | 08-248251 | 3/1996 | ............. 385/123 X |
| JP | 09-023187 | 1/1997 | ............. 385/123 X |
| JP | 10-319266 | 12/1998 | ............. 385/123 X |
| JP | 3068013 | 5/2000 | ............. 385/123 X |
| JP | 2002-62450 | 2/2002 | ............. 385/123 X |
| JP | 2002-719996 | 3/2002 | ............. 385/123 X |

OTHER PUBLICATIONS

"Experimental Study on SRS Loss and its Compensation in Three–Band WDM Transmission" Proceedings of ECOC 2000, vol. 3, pp. 39–40.

Shimizu, et al., "The Institute of Electronics, Information and Communication Engineers General Conference" C–3–33(2001), p. 198.

S.N. Knudsen et al., "Large Effective Area Dispersion Compensating Fiber for Cabled Compensation of Standard Single Mode Fiber" OFC2000, TuG5, pp. 98–100.

Primary Examiner—Brian M. Healy
(74) Attorney, Agent, or Firm—McDermott Will & Emery LLP

(57) ABSTRACT

The present invention relates to an optical transmission line and the like having a chromatic dispersion with a small absolute value as a whole within a signal wavelength band including S, C, and L bands. This optical transmission line comprises a single-mode optical fiber and a dispersion-compensating optical fiber which are connected to each other; and has, as characteristics of the whole optical transmission line at a wavelength of 1550 nm, a chromatic dispersion with an absolute value of 4 ps/nm/km or less, and a dispersion slope of −0.015 ps/nm²/km or more but less than 0 ps/nm²/km. Its chromatic dispersion has a maximum value within a wavelength range of 1450 to 1530 nm, and a minimum value within a wavelength range of 1570 to 1620 nm.

15 Claims, 14 Drawing Sheets

U.S. PATENT DOCUMENTS

| | | | |
|---|---|---|---|
| 5,887,093 A * | 3/1999 | Hansen et al. | 385/27 |
| 6,009,221 A | 12/1999 | Tsuda | 385/123 |
| 6,360,045 B1 * | 3/2002 | Shoval et al. | 385/123 |
| 6,404,967 B2 * | 6/2002 | Arai et al. | 385/126 |
| 6,477,306 B2 * | 11/2002 | Kato et al. | 385/123 |
| 6,490,398 B2 * | 12/2002 | Gruner-Nielsen et al. | 385/123 |
| 6,496,615 B2 * | 12/2002 | Okuno | 385/24 |
| 6,498,887 B1 * | 12/2002 | Gruner-Nielsen et al. | 385/123 |
| 6,546,180 B1 | 4/2003 | Koyano et al. | 385/123 |
| 2002/0041415 A1 * | 4/2002 | Tanaka et al. | 359/179 |
| 2002/0048439 A1 * | 4/2002 | Tsukitani et al. | 385/123 |
| 2002/0126973 A1 * | 9/2002 | Sugizaki et al. | 385/127 |
| 2002/0164139 A1 | 11/2002 | Saitou et al. | 385/127 |
| 2003/0152347 A1 | 8/2003 | Matsuo et al. | 385/123 |

* cited by examiner

Fig.11

|  |  | DCF1 | DCF2 | DCF3 | DCF4 | DCF5 | DCF6 | DCF7 |
|---|---|---|---|---|---|---|---|---|
| 2a | μm | 3.8 | 3.8 | 3.8 | 3.8 | 3.8 | 3.6 | 2.8 |
| 2b | μm | 9.8 | 9.5 | 9.8 | 10.0 | 9.2 | 9.8 | 9.1 |
| 2c | μm | 14.4 | 14.1 | 13.9 | 14.7 | 13.7 | 14.4 | 12.6 |
| Δ1 | % | 1.6 | 1.6 | 1.6 | 1.6 | 1.6 | 1.6 | 2.2 |
| Δ2 | % | -0.5 | -0.5 | -0.5 | -0.5 | -0.5 | -0.5 | -0.5 |
| Δ3 | % | 0.4 | 0.35 | 0.3 | 0.4 | 0.35 | 0.2 | 0.4 |
| CHROMATIC DISPERSION | ps/km/nm | -84.5 | -83.7 | -84.5 | -84.9 | -87.5 | -94.2 | -159.3 |
| DISPERSION SLOPE | ps/km/nm$^2$ | -0.34 | -0.31 | -0.28 | -0.37 | -0.42 | -0.37 | -0.65 |
| DISPERSION SLOPE at 1550nm | dB/km | 0.28 | 0.28 | 0.27 | 0.29 | 0.28 | 0.29 | 0.52 |
| DISPERSION SLOPE at 1450nm | dB/km | 0.43 | 0.44 | 0.42 | 0.42 | 0.43 | 0.42 | 0.73 |
| DISPERSION SLOPE at 1650nm | dB/km | 0.31 | 0.31 | 0.31 | 0.35 | 0.36 | 0.39 | 0.56 |
| INCREASE IN LOSS RESULTING FROM OH ABSORPTION | dB/km | 0.07 | 0.1 | 0.02 | 0.15 | 0.07 | 0.01 | 0.02 |
| FIGURE OF MERIT | ps/nm/dB | 302 | 299 | 313 | 293 | 313 | 325 | 306 |
| Aeff | μm$^2$ | 21 | 21 | 21 | 22 | 22 | 23 | 17 |
| MFD | μm | 5.1 | 5.1 | 5.1 | 5.2 | 5.1 | 7.5 | 4.4 |
| PMD | ps·km$^{-1/2}$ | 0.05 | 0.03 | 0.06 | 0.04 | 0.05 | 0.02 | 0.04 |

Fig. 14

| | DCF1+SMF1 | DCF2+SMF1 | DCF3+SMF1 | DCF4+SMF1 | DCF5+SMF1 | DCF6+SMF1 | DCF7+SMF1 | DCF3+SMF2 |
|---|---|---|---|---|---|---|---|---|
| DISPERSION SLOPE (ps/km/nm2) at 1550nm | -0.006 | -0.001 | +0.005 | -0.012 | -0.018 | -0.007 | -0.008 | -0.008 |
| WAVELENGTH YIELDING MAXIMUM DISPERSION (nm) | 1514 | 1537 | — | 1506 | 1500 | 1504 | 1513 | 1486 |
| WAVELENGTH YIELDING MINIMUM DISPERSION (nm) | 1582 | 1559 | — | 1600 | 1607 | 1574 | 1580 | 1576 |
| DISPERSION DEVIATION WITHIN WAVELENGTH RANGE OF 1450-1620 nm (ps/km/nm) | 0.85 | 1.38 | 2.23 | 0.83 | 1.45 | 0.75 | 1.01 | 0.65 |
| DISPERSION DEVIATION WITHIN WAVELENGTH RANGE OF 1480-1620 nm (ps/km/nm) | 0.35 | 0.73 | 1.57 | 0.83 | 1.45 | 0.49 | 0.42 | 0.65 |
| DISPERSION DEVIATION (ps/km/nm) WAVELENGTH RANGE (nm) | 0.33 1480-1580 | 0.16 1500-1600 | 0.72 1490-1590 | 0.53 1460-1560 | 0.69 1460-1560 | 0.40 1470-1570 | 0.38 1480-1580 | 0.50 1520-1620 |

OPTICAL TRANSMISSION LINE, AND OPTICAL FIBER AND DISPERSION COMPENSATING MODULE EMPLOYED IN THE SAME

BACKGROUND OF THE INVENTION

1. Field of the Invention

The present invention relates to an optical transmission line suitable for wavelength division multiplexing (WDM) transmission systems, and an optical fiber and dispersion compensating module employable therein.

2. Related Background Art

By transmitting signal light of multiple wavelengths of channels through an optical transmission line, WDM transmission systems make it possible to transmit/receive a large capacity of information. As a signal wavelength band utilized in such a WDM transmission system, C band (1530 nm to 1565 nm) has conventionally been in use, whereas signal light in the wavelength band of L band (1565 nm to 1625 nm) has recently come into use in response to a demand for a larger capacity.

In the optical transmission line as a whole, on the other hand, the optical pulse of signal light will broaden remarkably if the absolute value of chromatic dispersion is large. As a consequence, repeating sections are required to be elongated by lowering the absolute value of chromatic dispersion in the signal wavelength band in the optical transmission line as a whole. Single-mode optical fibers conventionally utilized as an optical transmission line have a positive chromatic dispersion in a 1.55-$\mu$m wavelength band, and general single-mode optical fibers have a zero-dispersion wavelength in a 1.3-$\mu$m wavelength band. Additionally, the single-mode optical fibers have a chromatic dispersion of about +16 to +20 ps/nm/km at a wavelength of 1.55 $\mu$m, and a dispersion slope of about +0.06 ps/nm$^2$/km at a wavelength of 1.55 $\mu$m. Therefore, in an optical transmission line constituted by single-mode optical fibers alone, the absolute value of chromatic dispersion becomes greater in the 1.55 $\mu$m wavelength band in the optical transmission line as a whole.

Hence, together with the single-mode optical fibers, dispersion-compensating optical fibers compensating for the chromatic dispersion of the single-mode optical fibers are utilized for constructing an optical transmission line, so as to lower the absolute value of chromatic dispersion in the 1.55 $\mu$m wavelength band in the optical transmission line as a whole. Here, the dispersion-compensating optical fibers have, as characteristics at a wavelength of 1.55 $\mu$m, a negative chromatic dispersion and a negative dispersion slope. Optical transmission lines, constructed by optically connecting such dispersion-compensating optical fibers and single-mode optical fibers to one another, having a chromatic dispersion with a small absolute value in a signal wavelength band including C and L bands are disclosed, for example, in literature 1, i.e., Shimizu, et al., The Institute of Electronics, Information and Communication Engineers General Conference C-3-33 (2001), and literature 2, i.e., S. N. Knudsen et al., OFC2000, TuG5, pp. 98-100 (2000).

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

The inventors studied the conventional optical transmission lines and, as a result, have found the following problem. As an entire signal wavelength band, the use of S band (1450 nm to 1530 nm) has recently been under consideration in addition to C and L bands. In this case, it is required that the absolute value of chromatic dispersion in optical transmission lines be small in a signal wavelength band including S, C, and L bands. However, no optical transmission line having a chromatic dispersion with a small absolute value in such a broad signal wavelength band as a whole has been known.

For overcoming the problem mentioned above, it is an object of the present invention to provide an optical transmission line having a chromatic dispersion with a small absolute value in an entire signal wavelength band including S, C, and L bands as a whole, and an optical fiber and dispersion compensating module employed therein.

The optical transmission line according to the present invention comprises a single-mode optical fiber having a positive chromatic dispersion in a 1.55-$\mu$m wavelength band, and a dispersion-compensating optical fiber for compensating for a chromatic dispersion of the single-mode optical fiber. The single-mode optical fiber and dispersion-compensating optical fiber are fusion-spliced to each other. The single-mode optical fiber preferably has a zero-dispersion wave length in a 1.3-$\mu$m wavelength band.

In particular, as characteristics of the whole optical transmission line at a wavelength of 1550 nm, the optical transmission line according to the present invention has a chromatic dispersion with an absolute value of 4 ps/nm/km or less, and a dispersion slope of −0.015 ps/nm$^2$/km or more but less than 0 ps/nm$^2$/km, preferably −0.005 ps/nm$^2$/km or less. Further, in the optical transmission line, the maximum value of chromatic dispersion exists within a wavelength range of 1450 to 1530 nm, whereas the minimum value of chromatic dispersion exists within a wavelength range of 1570 to 1620 nm. In this specification, the dispersion slope is given by the gradient (dD/d$\lambda$) of a graph indicating the dependency of dispersion D with respect to wavelength $\lambda$.

As a consequence of the configuration mentioned above, in a broad signal wavelength band including S, C, and L bands, the optical transmission line according to the present invention as a whole yields a chromatic dispersion with a small absolute value, and effectively suppresses the broadening in signal pulse, thereby realizing excellent transmission characteristics.

In the optical transmission line according to the present invention, the deviation (=the maximum value−the minimum value) of chromatic dispersion within a wavelength range of 1450 to 1620 nm is preferably 1.2 ps/nm/km or less, more preferably 0.8 ps/nm/km or less. In this case, the optical transmission line enables information transmission with a large capacity over a long haul.

In the optical transmission line according to the present invention, the deviation of chromatic dispersion within a wavelength range of 1480 to 1620 nm is preferably 0.7 ps/nm/km or less, more preferably 0.5 ps/nm/km or less. In this case, the optical transmission line not only enables information transmission with a large capacity over a long haul, but signal light also can be collectively amplified by rear-earth doped optical fiber amplifiers (e.g., Er-or Tm-doped optical amplifier), thereby making it possible to transmit information over a longer distance.

Preferably, in the optical transmission line according to the present invention, the deviation of chromatic dispersion within a wavelength range having a width of 100 nm included in a wavelength range of 1450 to 1620 nm is 0.4 ps/nm/km or less. The dispersion-compensating optical fiber enables Raman amplification of signal light when pumping light of Raman amplification is supplied thereto. In this case, the optical transmission line not only enables information transmission with a large capacity over a long haul, but signal light also can be collectively amplified by Raman amplification when pumping light is supplied to the dispersion-compensating optical fiber, thereby making it possible to transmit information over a longer distance.

In the optical transmission line according to the present invention, the dispersion-compensating optical fiber has a chromatic dispersion of −200 ps/nm/km or more but −50 ps/nm/km or less at a wavelength of 1550 nm. Namely, the optical fiber (corresponding to the above-mentioned dispersion-compensating optical fiber) employed in the optical transmission line has a chromatic dispersion of less than zero at a wavelength of 1550 nm. Also, as characteristics at a wavelength of 1550 nm, the dispersion-compensating optical fiber has a figure of merit, defined by the ratio ($|D|/L$) of an absolute value of chromatic dispersion D to transmission loss L, of 200 ps/nm/km or more, and a polarization mode dispersion of 0.3 ps·km$^{-1/2}$ or less. In this case, an optical fiber having a large dispersion compensation amount and a low loss is obtained.

Preferably, in the optical transmission line according to the present invention, the increase in transmission loss of the dispersion-compensating optical fiber resulting from OH absorption near a wavelength of 1.38 μm is 0.2 dB/km or less. Since the increase in loss resulting from OH absorption is small as such, the dispersion-compensating optical fiber is suitable for transmitting S-band signals and supplying pumping light of Raman amplification effectively.

Preferably, in the optical transmission line according to the present invention, the transmission loss of the dispersion-compensating optical fiber at a wavelength of 1620 nm is smaller than that in the dispersion-compensating optical fiber at a wavelength of 1450 nm. The transmission loss of a dispersion-compensating optical fiber at a wavelength of 1620 nm may become greater than that at a wavelength of 1450 nm because of bending loss. When the transmission loss of a dispersion-compensating optical fiber at a wavelength of 1620 nm is smaller than that at a wavelength of 1450 nm as in the optical transmission line according to the present invention, however, the transmission loss can be suppressed to a low level over an entire wavelength range of 1450 to 1620 nm.

In the optical transmission line according to the present invention, the dispersion-compensating optical fiber may be wound like a coil so as to form a module (constructing the dispersion compensating module according to the present invention). Here, the dispersion compensating module wound like a coil is accommodated in a packaging having a size of 250 mm×250 mm×50 mm or smaller. In particular, in the modularized state, the dispersion-compensating optical fiber preferably has a cutoff wavelength of 1450 nm or shorter, and a polarization mode dispersion of 0.3 ps·km$^{-1/2}$ or less at a wavelength of 1550 nm. Preferably, the transmission loss of the dispersion-compensating optical fiber at a wavelength of 1620 nm is smaller than that at a wavelength of 1450 nm. In this case, the dispersion-compensating optical fiber is made smaller as being modularized, whereby it can be installed in a repeater or the like. Also, even in the modularized state, its transmission loss is small, and its cutoff wavelength is shorter than the wavelength in use.

The optical fiber (the above-mentioned dispersion-compensating optical fiber) employed in the optical transmission line according to the present invention comprises, at least, a core region extending along a predetermined axis, a depressed region provided on the outer periphery of the core region, a ridged region provided on the outer periphery of the depressed region, and an outer cladding region provided on the outer periphery of the ridged region. The core region has a maximum refractive index n1, the depressed region has a minimum refractive index n2 (<n1), the ridged region has a maximum refractive index n3 (>n2), and the outer cladding region has a maximum refractive index n4 (<n3). Further, the optical fiber employed in the optical transmission line according to the present invention may comprise a structure in which an additional depressed region or ridged region is further provided between the ridged region and outer cladding.

The present invention will become more fully understood from the detailed description given hereinbelow and the accompanying drawings which are given by way of illustration only, and thus are not to be considered as limiting the present invention.

Further scope of applicability of the present invention will be come apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 10A is a sectional view showing the structure of a dispersion-compensating optical fiber employed in the optical transmission line according to the present invention, whereas

FIG. 11 is a table showing characteristics of a plurality of samples (DCF1 to DCF7) corresponding to the dispersion-compensating optical fiber employed in the optical transmission line according to the present invention;

FIG. 14 is a table listing various characteristics of optical transmission lines employing different samples;

DETAILED DESCRIPTION OF THE PREFERRED EMBODIMENTS

In the following, embodiments of the optical transmission line and the like according to the present invention will be explained in detail with reference to FIGS. 1 to 3, 4A, 4B, 5 to 9, 10A, 10B, 11 to 17, 18A, and 18B. In the explanation of the drawings, constituents identical to each other will be referred to with numerals or letters identical to each other without repeating their overlapping descriptions.

Figure 1:
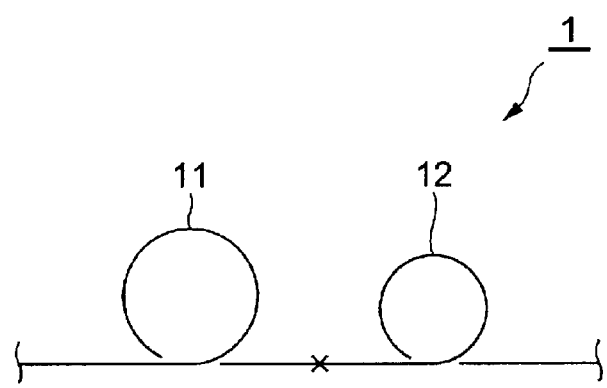
FIG. 1 is a diagram showing the schematic configuration of an optical transmission line according to the present invention.
Figure 2:
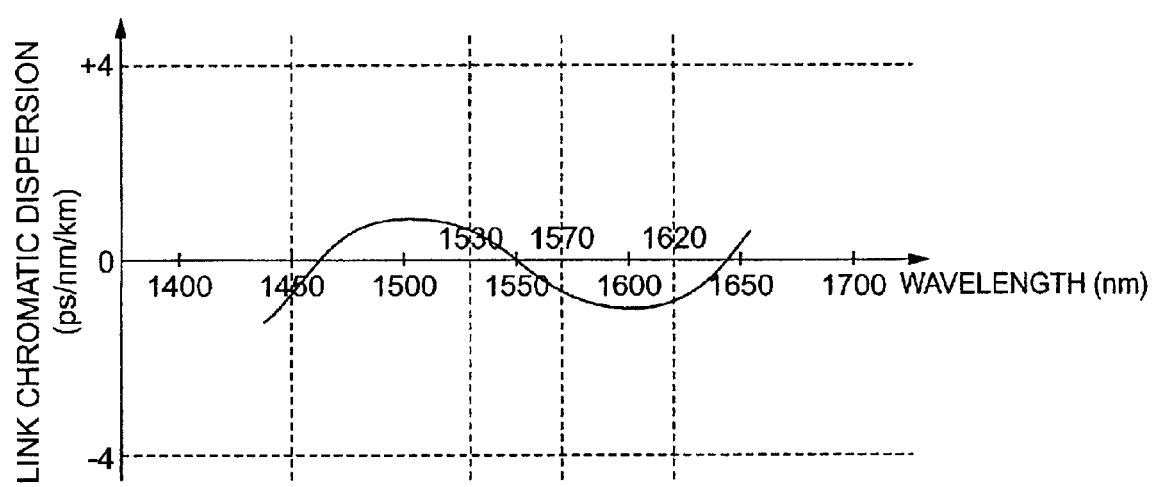
FIG. 2 is a graph showing the chromatic dispersion characteristic of the optical transmission line according to the present invention.
Figure 3:
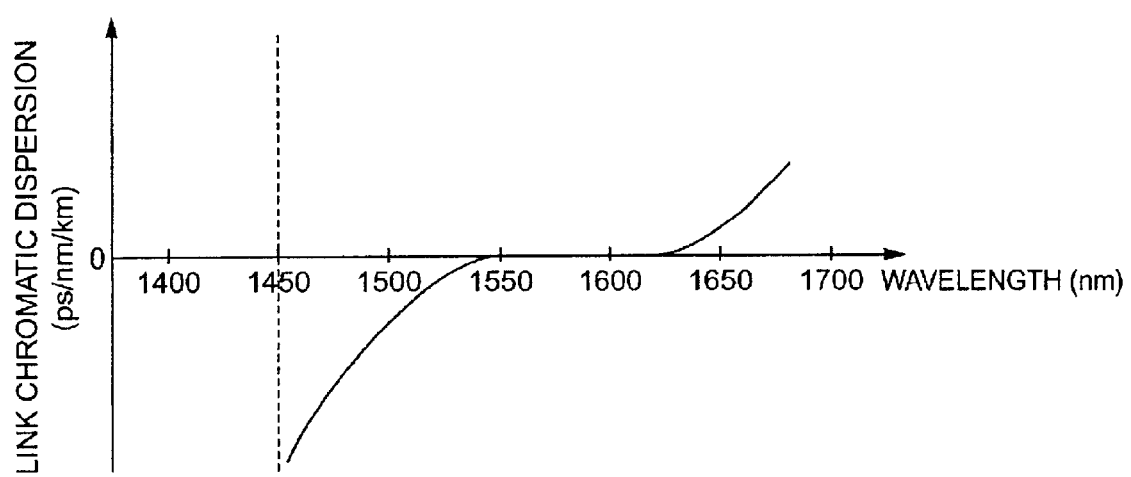
FIG. 3 is a graph showing the chromatic dispersion characteristic of an optical transmission line acting as a comparative example.

First, the schematic configuration and chromatic dispersion characteristic of the optical transmission line according to the present invention will be explained with reference to FIGS. 1 to 3. FIG. 1 is a diagram showing the schematic configuration of an optical transmission line 1 according to the present invention. FIG. 2 is a graph showing the chromatic dispersion characteristic of the optical fiber transmission line 1 according to the present invention. FIG. 3 is a graph showing the chromatic dispersion characteristic of an optical transmission line acting as a comparative example.

As shown in FIG. 1, the optical transmission line 1 according to the present invention is constituted by a single-mode optical fiber 11 and a dispersion-compensating optical fiber 12 which are optically connected to each other.

The single-mode optical fiber 11 has a positive chromatic dispersion in a 1.55-μm wavelength band (preferably having a zero-dispersion wavelength in a 1.3-μm wavelength band and has), as characteristics at a wavelength of 1.55 μm, a chromatic dispersion of about +16 to +20 ps/nm/km and a dispersion slope of about +0.06 ps/nm$^2$/km. In this specification, the dispersion slope is given by the gradient (dD/dλ) of a graph indicating the dependency of dispersion D with respect to wavelength λ. On the other hand, the dispersion-compensating optical fiber 12 is an optical fiber for compensating for the chromatic dispersion of the single-mode optical fiber 11 in the signal wavelength band and has, as characteristics at a wavelength of 1550 nm, a negative chromatic dispersion and a negative dispersion slope.

As shown in FIG. 2, the optical transmission line 1 according to the present invention has, as its characteristics at a wavelength of 1550 nm, a chromatic dispersion with an absolute value of 4 ps/nm/km or less and a dispersion slope of −0.015 ps/nm$^2$/km or more but less than 0 ps/nm$^2$/km as shown in FIG. 3. In the optical transmission line 1, the maximum value of chromatic dispersion exists within the wavelength range of 1450 to 1530 nm, whereas the minimum value of chromatic dispersion exists within the wavelength range of 1570 to 1620 nm.

The optical transmission line acting as a comparative example is configured similar to that of FIG. 1, but has, as its overall characteristics at a wavelength of 1550 nm, a chromatic dispersion with a small absolute value and a dispersion slope of 0 ps/nm$^2$/km or more. Therefore, in the optical transmission line of the comparative example, the maximum value of chromatic dispersion does not exist within the wavelength range of 1450 to 1530 nm, whereas the minimum value of chromatic dispersion does not exist within the wavelength range of 1570 to 1620 nm. The optical transmission line of the comparative example is suitable for WDM transmissions concerning signal light in a signal wavelength band including both or one of C and L bands (not including S band).

The chromatic dispersion characteristic of the optical transmission line 1 according to the present invention (FIG. 2) differs from that of the optical transmission line of the comparative example (FIG. 3) in that it has, as overall characteristics at a wavelength of 1550 nm, a dispersion slope of −0.015 ps/nm$^2$/km or more but less than 0 ps/nm$^2$/km, a maximum value of chromatic dispersion located within the wavelength range of 1450 to 1530 nm, and a minimum value of chromatic dispersion located within the wavelength range of 1570 to 1620 nm. Due to such differences, while the absolute value of chromatic dispersion inevitably becomes greater in S band in the optical transmission line of the comparative example, the absolute value of chromatic dispersion in the whole signal wavelength band including S, C, and L bands is small in the optical transmission line 1 according to the present invention. Therefore, the optical transmission line 1 can effectively suppress broadening in pulse of signal light in a broad signal wavelength band, thereby realizing excellent transmission characteristics.

A large capacity of information can be transmitted over a long haul if the deviation of chromatic dispersion within the wavelength range of 1450 to 1620 nm in the optical transmission line 1 according to the present invention is 1.2 ps/nm/km or less, more preferably 0.8 ps/nm/km or less. When the deviation of chromatic dispersion within the wavelength range of 1480 to 1620 nm in the optical transmission line 1 is 0.7 ps/nm/km or less, more preferably 0.5 ps/nm/km or less, the optical transmission line 1 not only enables long-haul transmission of information with a large capacity, but signal light also can be collectively amplified by rear-earth doped optical fiber amplifiers (e.g., Er- or Tm-doped optical amplifier) is employed as an optical amplifier medium, whereby longer-haul transmission is possible.

Preferably, in the optical transmission line 1 according to the present invention, the deviation of chromatic dispersion within a wavelength range having a width of 100 nm included in the wavelength range of 1450 to 1620 nm is 0.4 ps/nm/km or less. The dispersion-compensating optical fiber 12 can amplify signal light when pumping light of Raman amplification is supplied thereto. This case not only enables information transmission with a large capacity over a long haul, but signal light also can be collectively amplified by Raman amplification when pumping light is supplied to the dispersion-compensating optical fiber 12, thereby making it possible to transmit information over a longer distance.

The dispersion-compensating optical fiber 12 of the optical transmission line 1 is an optical fiber having, as characteristics at a wavelength of 1550 nm, a chromatic dispersion of −200 ps/nm/km or more but −50 ps/nm/km or less at a wavelength of 1550 nm, a figure of merit, defined by the ratio ($|D|/L$) of an absolute value of chromatic dispersion D to loss L, of 200 ps/nm/km or more, and a polarization mode dispersion of 0.3 ps·km$^{-1/2}$ or less, while yielding a large dispersion compensation amount and a low loss.

Preferably, in the dispersion-compensating optical fiber 12 in the optical transmission line 1, the increase in loss of the dispersion-compensating optical fiber resulting from OH absorption near a wavelength of 1.38 $\mu$m is 0.2 dB/km or less. Since the increase in loss resulting from OH absorption is small, this case makes it possible to transmit S-band signals and supply pumping light of Raman amplification effectively.

Preferably, in the dispersion-compensating optical fiber 12 in the optical transmission line 1, the transmission loss at a wavelength of 1620 nm is smaller than that at a wavelength of 1450 nm, whereby the transmission loss of the optical transmission line 1 as a whole is suppressed to a low level over the entire wavelength range of 1450 to 1620 nm.

Figure 4A:
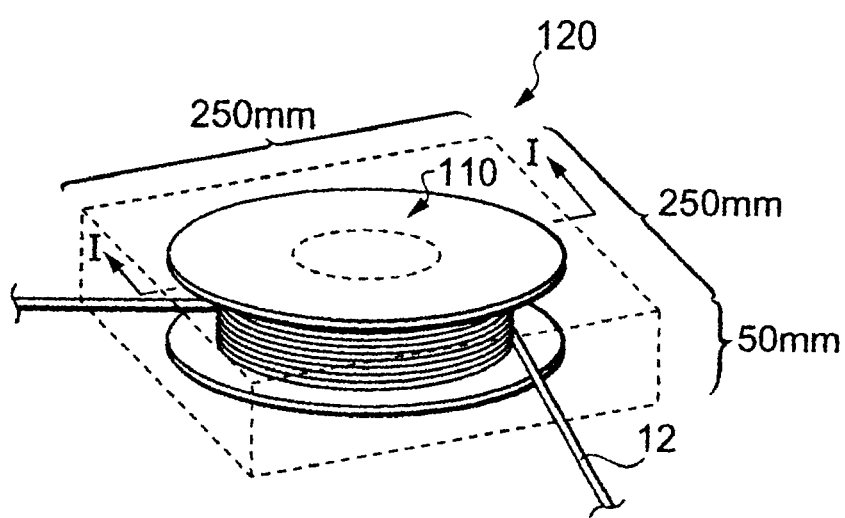
FIGS. 4A and 4B are views showing the configuration of a dispersion compensating module according to the present invention.
Figure 4B:
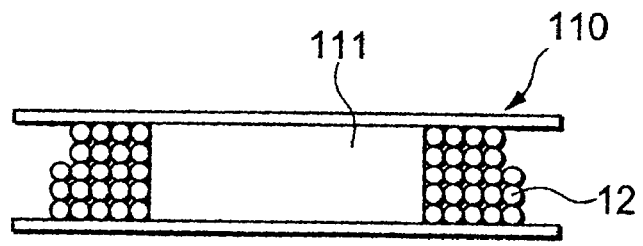

As shown in FIGS. 4A and 4B, the dispersion-compensating optical fiber 12 constitutes a dispersion compensating module 120 when wound like a coil. Here, FIG. 4A is a view showing the configuration of the dispersion compensating module 120 according to the present invention, whereas FIG. 4B is a sectional view of the dispersion compensating module taken along the line I—I in FIG. 4A. The dispersion compensating module 120 comprises the dispersion-compensating optical fiber 12 wound about a barrel 111 of a bobbin 110, and a case for accommodating the bobbin 110 together with the dispersion-compensating optical fiber 12 wound thereabout. This case has a size of 250 mm×250 mm×50 mm or smaller. In thus modularized state, the dispersion compensating module 120 has a cutoff wavelength of 1450 nm or shorter, and a polarization mode dispersion of 0.3 ps·km$^{-1/2}$ or less. Also, it is designed such that the transmission loss at a wavelength of 1620 nm is smaller than that at a wavelength of 1450 nm. In this case, since the dispersion-compensating optical fiber 12 is modularized (made smaller), it can be installed in a repeater or the like, while yielding a low loss and a cutoff wavelength shorter than the wavelength in use even in the modularized state.

Though the dispersion-compensating optical fiber 12 is wound about the barrel 111 of the bobbin 110 in the dispersion compensating module 120 shown in FIG. 4A, it may also be wound in a state without the bobbin 110. In the latter case, it is preferred that thus wound dispersion-compensating optical fiber 12 be molded with a resin or the like in order to facilitate its handling.

Figure 5:
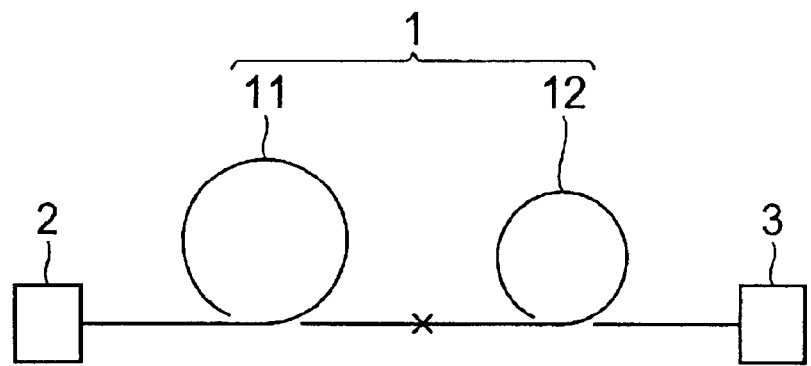
FIG. 5 is a diagram showing the configuration of a first embodiment in the optical transmission line according to the present invention.

Various embodiments of the optical transmission line 1 according to the present invention will now be explained. FIG. 5 is a diagram showing the configuration of the first embodiment of the optical transmission line 1 according to the present invention. As shown in FIG. 5, the optical transmission line 1 according to the first embodiment is constituted by the single-mode optical fiber 11 and dispersion-compensating optical fiber 12 fusion-spliced to each other, and is laid in a repeating section between a repeater (or transmitter) 2 and a repeater (or receiver) 3. In the optical transmission line 1 according to the first embodiment, it is preferred that an optical amplifier (e.g. a rear-earth doped optical fiber amplifier or a Raman amplifier) be provided within the repeater 3 in order to compensate for the loss of signal light.

Figure 6:
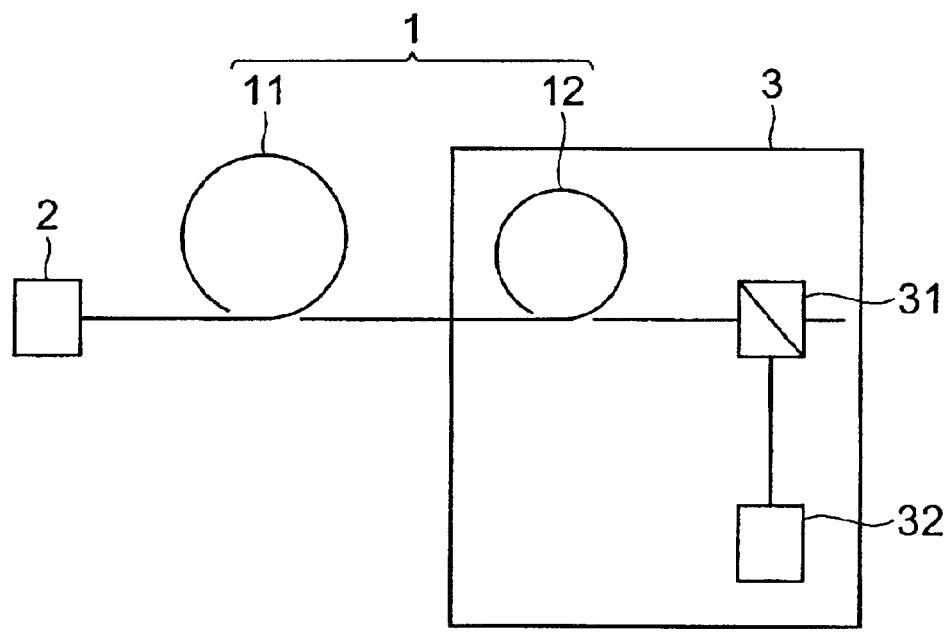
FIG. 6 is a diagram showing the configuration of a second embodiment in the optical transmission line according to the present invention.

FIG. 6 is a diagram showing the configuration of the second embodiment of the optical transmission line 1 according to the present invention. As shown in FIG. 6, the single-mode optical fiber 11 of the optical transmission line 1 according to the second embodiment is laid in a repeating section between a repeater (or transmitter) 2 and a repeater (or receiver) 3, whereas the dispersion-compensating optical fiber 12, modularized as shown in FIGS. 4A and 4B, is disposed within the repeater 3. Also, an optical coupler 31 and a pumping light of Raman amplification source unit 32 are disposed within the repeater 3. In this case, the pumping light of Raman amplification outputted from the pumping light of Raman amplification source unit 32 is supplied to the dispersion-compensating optical fiber 12 by way of the optical coupler 31. Then, the signal light propagating through the dispersion-compensating optical fiber 12 is amplified at the time of propagation. Namely, in the second embodiment, the dispersion-compensating optical fiber 12 carries out dispersion compensation and amplification of the signal light at the same time. The pumping light of Raman amplification source unit 32 may output either pumping light of Raman amplification having a single wavelength or that having a plurality of channels or a broad bandwidth. The latter case is preferred since the wavelength range of signal light to be Raman-amplified becomes wider.

Figure 7:
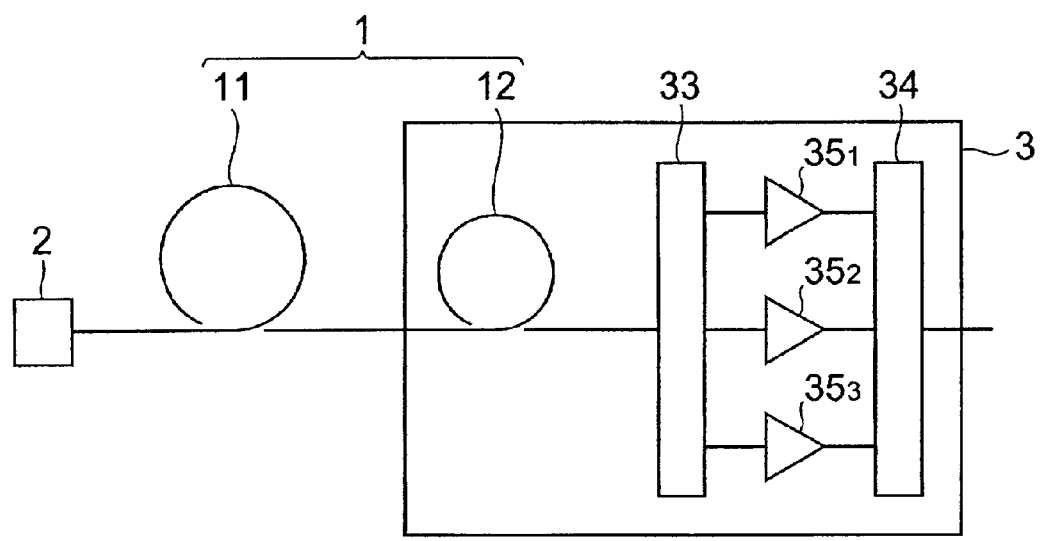
FIG. 7 is a diagram showing the configuration of a third embodiment in the optical transmission line according to the present invention.

FIG. 7 is a diagram showing the configuration of the third embodiment of the optical transmission line 1 according to the present invention. As shown in FIG. 7, the single-mode optical fiber 11 of the optical transmission line 1 according to the third embodiment is laid in a repeating section between a repeater (or transmitter) 2 and a repeater (or receiver) 3, whereas the dispersion-compensating optical fiber 12, modularized as shown in FIGS. 4A and 4B, is disposed within the repeater 3. Also, a demultiplexer 33, a multiplexer 34, and optical amplifiers 351 to 353 are disposed within the repeater 3. In this case, signal light in a signal wavelength band including S, C, and L bands having reached the repeater 3 is compensated for in terms of dispersion by the dispersion-compensating optical fiber 12 and then is demultiplexed into the individual bands by the demultiplexer 33. The signal light component of S band outputted from the demultiplexer 33 is optically amplified by the optical amplifier $35_1$ (e.g., an optical fiber amplifier doped with Tm element) and then is guided to the multiplexer 34. The signal light component of C band outputted from the demultiplexer 33 is optically amplified by the optical amplifier $35_2$ (e.g., an optical fiber amplifier doped with Er element) and then is guided to the multiplexer 34. The signal light component of L band outputted from the demultiplexer 33 is optically amplified by the optical amplifier $35_3$ (e.g., an optical fiber amplifier doped with Er element) and then is guided to the multiplexer 34. Subsequently, the signal light components of S, L, and C bands are multiplexed by the multiplexer 34. Here, the demultiplexer 33 and multiplexer 34 may multi/demultiplex not only three wavelength regions, but also more signal channels.

Figure 8:
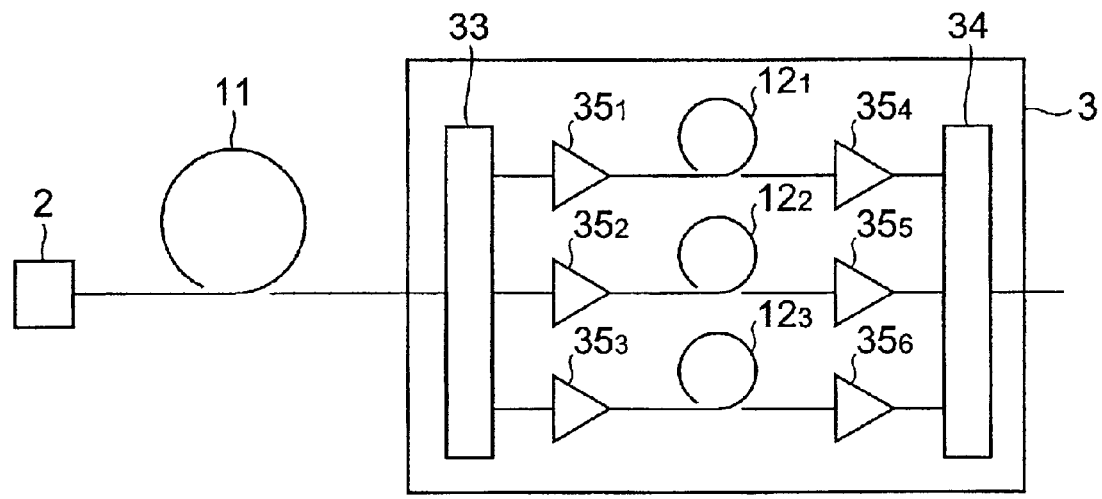
FIG. 8 is a diagram showing the configuration of a fourth embodiment in the optical transmission line according to the present invention.

FIG. 8 is a diagram showing the configuration of the fourth embodiment of the optical transmission line 1 according to the present invention. As shown in FIG. 8, the single-mode optical fiber 11 of the optical transmission line 1 according to the fourth embodiment is laid in a repeating section between a repeater (or transmitter) 2 and a repeater (or receiver) 3, whereas dispersion-compensating optical fibers $12_1$ to $12_3$, each modularized as shown in FIGS. 4A and 4B, are disposed within the repeater 3. Also, a demultiplexer 33, a multiplexer 34, and optical amplifiers $35_1$ to $35_6$ are disposed within the repeater 3. In this case, the signal light in a signal wavelength band including S, C, and L bands having reached the repeater 3 is demultiplexed into the individual bands by the demultiplexer 33. The signal light component of S band outputted from the demultiplexer 33 is optically amplified by the optical amplifier $35_1$, subsequently compensated for in terms of dispersion by the dispersion-compensating optical fiber $12_1$, optically amplified again by the optical amplifier $35_4$, and then guided to the multiplexer 34. The signal light component of C band outputted from the demultiplexer 33 is optically amplified by the optical amplifier $35_2$, subsequently compensated for in terms of dispersion by the dispersion-compensating optical fiber $12_2$, optically amplified again by the optical amplifier $35_5$, and then guided to the multiplexer 34. The signal light component of L band outputted from the demultiplexer 33 is optically amplified by the optical amplifier $35_3$, subsequently compensated for in terms of dispersion by the dispersion-compensating optical fiber $12_3$, optically amplified again by the optical amplifier $35_6$, and then guided to the multiplexer 34. Thereafter, the signal light components of S, C, and L bands are multiplexed by the multiplexer 34. When the optical amplifiers 35 are provided both upstream and downstream the dispersion-compensating optical fibers 12 as such, the dispersion-compensating optical fibers 12 yielding a large attenuation in general can be used with a long length, whereby repeating sections can also be made longer. The demultiplexer 33 and multiplexer 34 may multi/demultiplex not only three wavelength regions, but also more signal channels.

Figure 9:
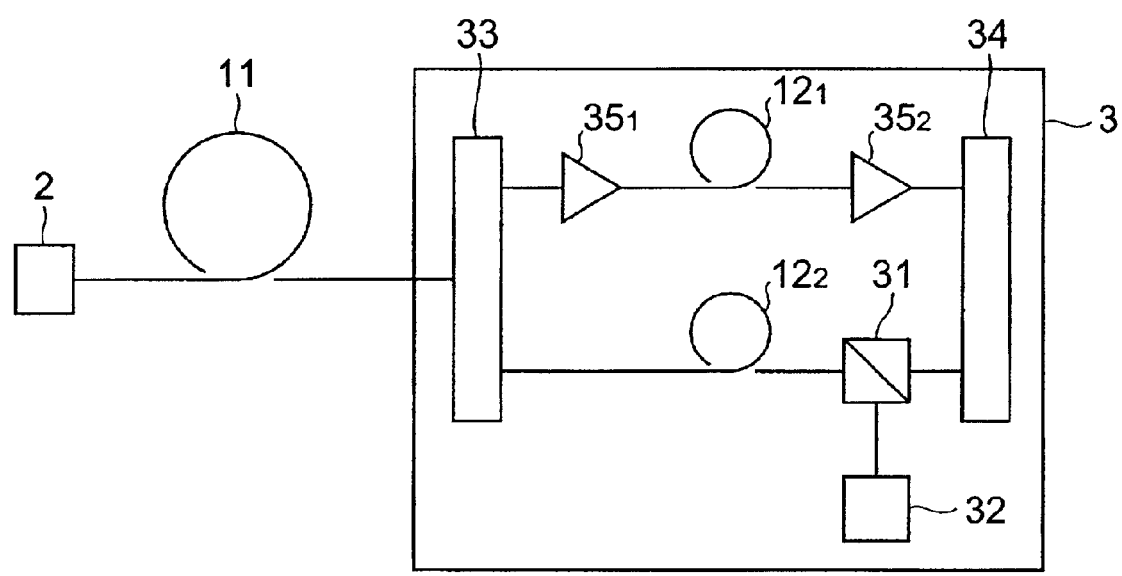
FIG. 9 is a diagram showing the configuration of a fifth embodiment in the optical transmission line according to the present invention.

FIG. 9 is a diagram showing the fifth embodiment of the optical transmission line 1 according to the present invention. As shown in FIG. 9, the single-mode optical fiber 11 of the optical transmission line 1 according to the fifth embodiment is laid in a repeating section between a repeater (or transmitter) 2 and a repeater (or receiver) 3, whereas dispersion-compensating optical fibers $12_1$ and $12_2$, each modularized as shown in FIGS. 4A and 4B, are disposed within the repeater 3. Also, a demultiplexer 33, a multiplexer 34, optical amplifiers $35_1$, $35_2$, an optical coupler 31, and a pumping light of Raman amplification source unit 32 are disposed within the repeater 3. In this case, the signal light in a signal wavelength band including S, C, and L bands having reached the repeater 3 is demultiplexed into the individual bands by the demultiplexer 33. The signal light components of C and L bands outputted from the demultiplexer 33 are optically amplified by the optical amplifier $35_1$, subsequently compensated for in terms of dispersion by the dispersion-compensating optical fiber $12_1$, optically amplified again by the optical amplifier $35_2$, and then guided to the multiplexer 34. On the other hand, the signal light component of S band outputted from the demultiplexer 33 is compensated for in terms of dispersion and amplified by stimulated Raman effects in the dispersion-compensating optical fiber $12_2$, and then is guided to the multiplexer 34. Thereafter, the signal light components of S, C, and L bands are multiplexed by the multiplexer 34. When an optical fiber amplifier and a Raman amplifier are used selectively as such, a higher optical amplifier efficiency is obtained. The demultiplexer 33 and multiplexer 34 may multi/demultiplex not only three wavelength regions, but also more signal channels.

Figure 10A:
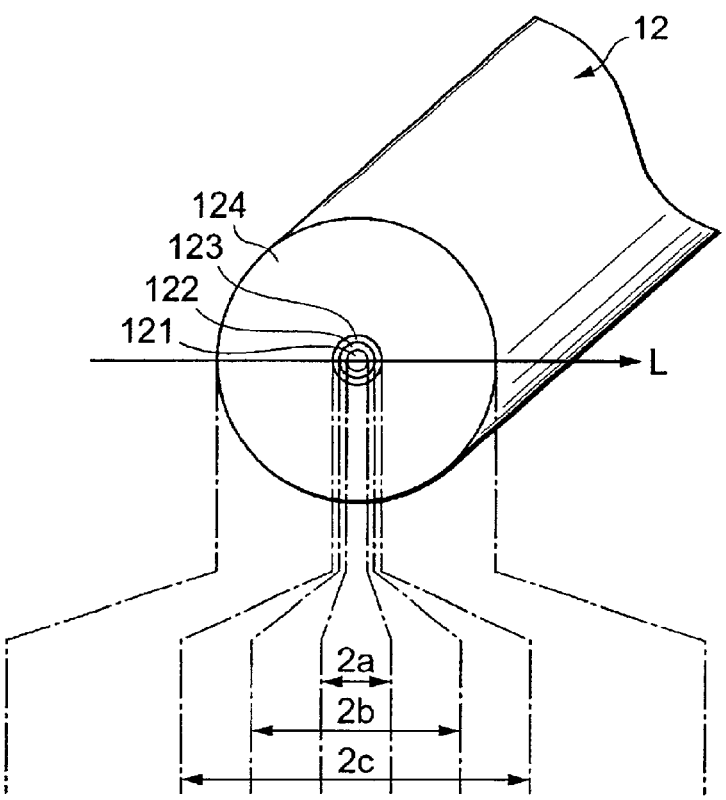

The structure of a dispersion-compensating optical fiber 12 employed in the optical transmission line 1 according to the present invention will now be explained. FIG. 10A is a sectional view showing the structure of the dispersion-compensating optical fiber 12, whereas FIG. 10B is a refractive index profile thereof.

The dispersion-compensating optical fiber 12 has a core region 121 extending along a predetermined axis, a depressed region 122 provided at the outer periphery of the core region 121, a ridged region 123 provided on the outer periphery of the depressed region 122, and an outer cladding region 124 provided on the outer periphery of the ridged region 123. The core region 121 has an outer diameter 2a and a maximum refractive index n1. The depressed region 122 has an outer diameter 2b and a minimum refractive index n2 (<n1). The ridged region 123 has an outer diameter 2c and a maximum refractive index n3 (>n2). The cladding region 124 has a maximum refractive index n4 (<n3). The dispersion-compensating optical fiber 12 having the structure mentioned above is obtained when, for example, while being mainly composed of silica glass, the core region 121 and ridged region 123 are doped with respective appropriate amounts of $GeO_2$, and the depressed region 122 is doped with F element.

Figure 10B:
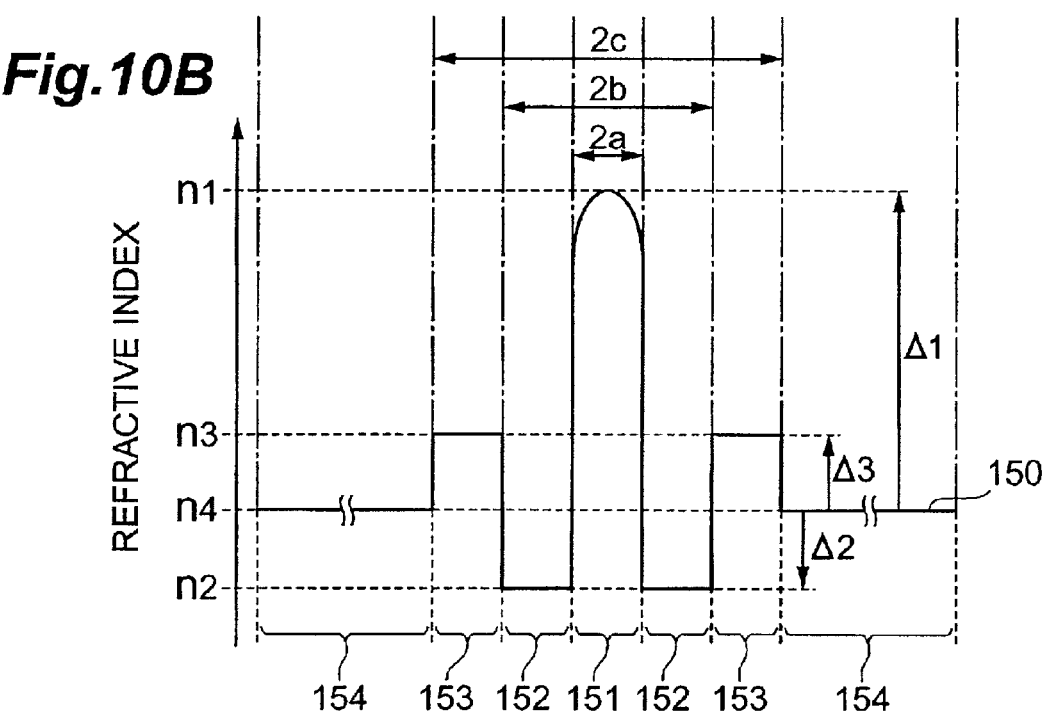
FIG. 10B is a refractive index profile thereof.

The refractive index profile 150 shown in FIG. 10B indicates the refractive index at each location on the line L in FIG. 10A, such that areas 151, 152, 153, and 154 represent refractive indices on the line L of the core region 121, depressed region 122, ridged region 123, and outer cladding region 124, respectively.

In this specification, respective relative refractive index differences Δ1, Δ2, and Δ3 of the core region 121, depressed region 122, and ridged region 123 with reference to the outer cladding region 124 are given by the following expressions:

$$\Delta 1 = ((n1)^2 - (n4)^2)/2(n4)^2$$

$$\Delta 2 = ((n2)^2 - (n4)^2)/2(n4)^2$$

$$\Delta 3 = ((n3)^2 - (n4)^2)/2(n4)^2$$

As mentioned above, each of the respective relative refractive index differences of the glass regions 121 to 123 with respect to the outer cladding region 124 acting as a reference region is expressed in terms of percentage, whereas the refractive indices in each expression are in a fixed order. Therefore, the refractive index of a glass layer whose refractive index difference exhibits a negative value is meant to be lower than that of the outer cladding region 124.

Figure 12:
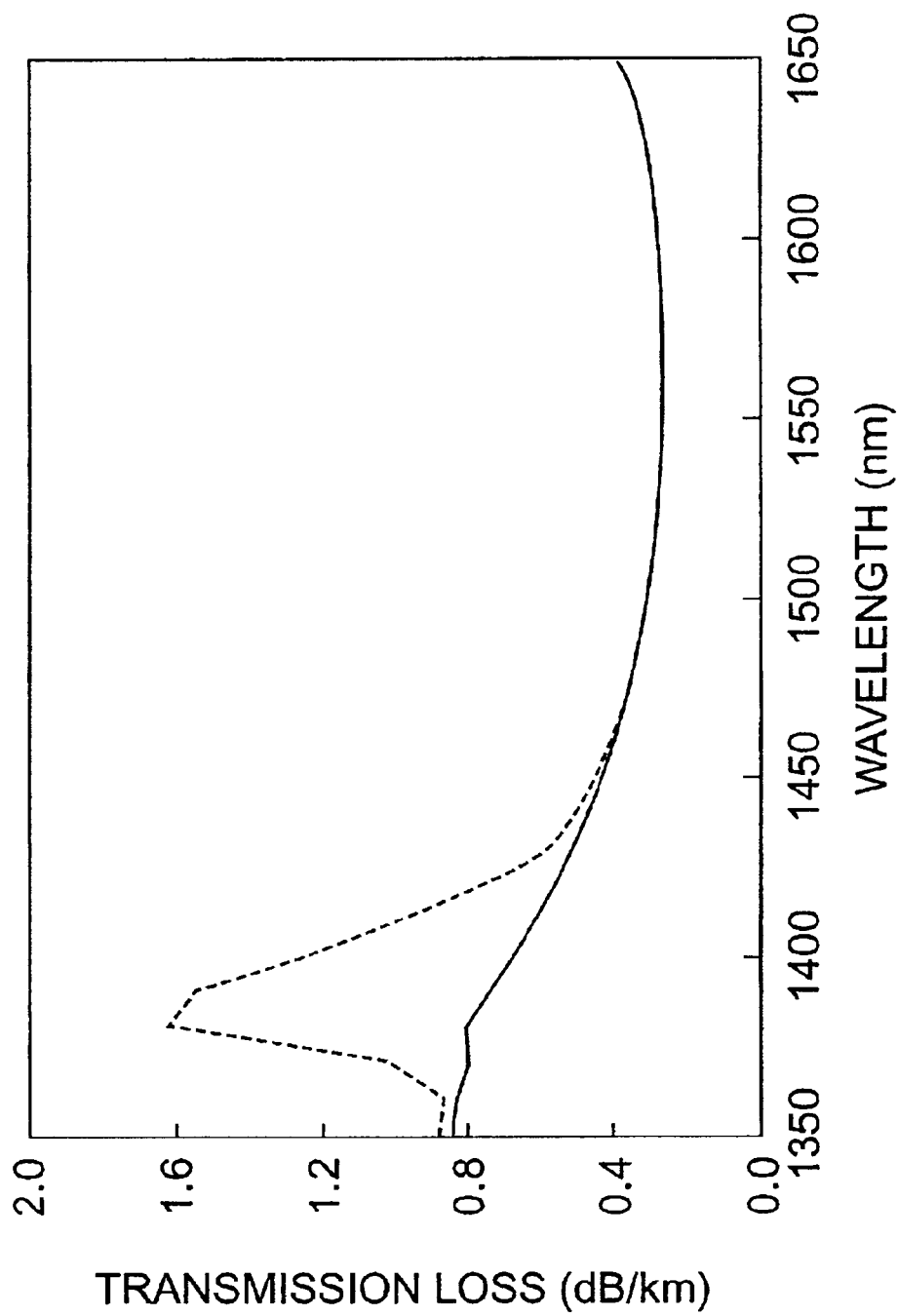
FIG. 12 is a graph showing the transmission loss characteristic of sample DCF1.

FIG. 11 is a table listing various characteristics of samples DCF1 to DCF7 corresponding to the dispersion-compensating optical fiber 12. In FIG. 11, chromatic dispersion, dispersion slope, figure of merit, effective area ($A_{eff}$), mode field diameter (MFD), and polarization mode dispersion (PMD) are respective values at a wavelength of 1550 nm. FIG. 12 is a graph showing the transmission loss characteristic of sample DCF1 of the dispersion-compensating optical fiber. In this graph, the dotted curve shows the increase in loss resulting from normal OH absorption. In this sample DCF1, the increase in loss resulting from OH absorption is small, i.e., 0.2 dB/km or less. Also, in this sample DCF1, the transmission loss at a wavelength of 1620 nm is smaller than that at a wavelength of 1450 nm. The other samples DCF2 to DCF7 are similar in this regard.

Figure 13:
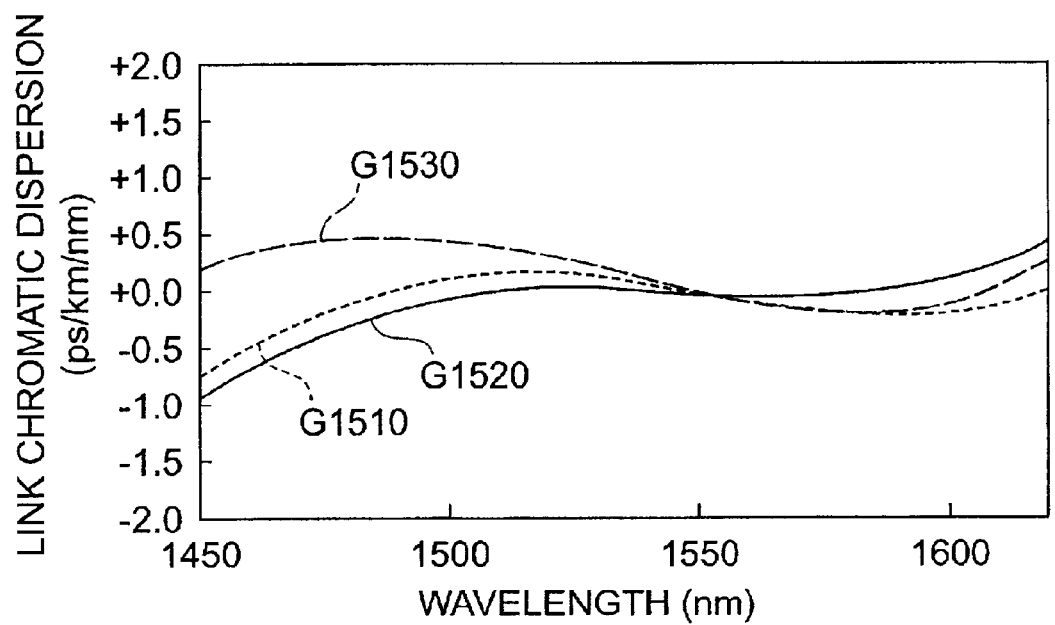
FIG. 13 is a graph showing chromatic dispersion characteristics of optical transmission lines employing different samples.

FIG. 13 is a graph showing chromatic dispersion characteristics of the optical transmission line 1 in which different samples mentioned above are employed. As the single-mode optical fiber 11, two kinds of samples of SMF1 and SMF2 were prepared. The single-mode optical fiber SMF1 comprises a core region and a cladding region provided on the outer periphery of the core region, in which the core region is made of silica glass doped with $GeO_2$, whereas the cladding region is made of pure silica glass. As characteristics at a wavelength of 1550 nm, the single-mode optical fiber SMF1 has a chromatic dispersion of +16.3 ps/nm/km, a dispersion slope of +0.059 ps/nm$^2$/km, a transmission loss of 0.19 dB/km, and an effective area $A_{eff}$ of 75 $\mu$m$^2$. On the other hand, the single-mode optical fiber SMF2 comprises a core region and a cladding region provided on the outer periphery of the core region, in which the core region is made of pure silica glass, whereas the cladding region is made of silica glass doped with F element. As characteristics at a wavelength of 1550 nm, the single-mode optical fiber SMF2 has a chromatic dispersion of +20.4 ps/nm/km, a dispersion slope of +0.059 ps/nm$^2$/km, a transmission loss of 0.17 dB/km, and an effective area $A_{eff}$ of 115 $\mu$m$^2$.

Here, as shown in Japanese Patent Application Laid-Open No. HEI 8-248251 (EP 0 724 171 A2), the above-mentioned effective area $A_{eff}$ is given by the following expression:

$$A_{eff} = 2\pi \left( \int_0^\infty E^2 r\, dr \right)^2 / \left( \int_0^\infty E^4 r\, dr \right)$$

where E is the electric field accompanying the propagating light, and r is the radial distance from the center of the core region.

In FIG. 13, curves G1510, G1520, and G1530 show respective chromatic dispersion characteristics of an optical transmission line made of the dispersion-compensating optical fiber DCF1 and single-mode optical fiber SMF1, an optical transmission line made of the dispersion-compensating optical fiber DCF2 and the single-mode optical fiber SMF1, and an optical transmission line made of the dispersion-compensating optical fiber DCF3 and the single-mode optical fiber SMF2.

FIG. 14 is a table listing various characteristics of the optical transmission line 1 in which different samples are employed. This table shows various characteristics of each of respective optical transmission lines made of dispersion-compensating optical fibers DCFn (n=1 to 7) and the single-mode optical fiber SMF1, and an optical transmission line made of the dispersion-compensating optical fiber DCF3 and the single-mode optical fiber SMF2. In each of these optical transmission lines, the ratio between respective lengths of the dispersion-compensating optical fiber and single-mode optical fiber are adjusted such that the chromatic dispersion at a wavelength of 1550 nm becomes 0 ps/nm/km.

As can be seen from FIGS. 13 and 14, except for the "DCF2+SMF1" optical transmission line, "DCF3+SMF1" optical transmission line, and "DCF5+SMF1" optical transmission line, each sample of optical transmission line has, as characteristics of the whole optical transmission line at a light wavelength of 1550 nm, a chromatic dispersion with an absolute value of 4 ps/nm/km or less and a dispersion slope of −0.015 ps/nm$^2$/km or more but less than 0 ps/nm$^2$/km, whereas the maximum and minimum values of chromatic dispersion exist within the wavelength ranges of 1450 to 1530 nm and 1570 to 1620 nm, respectively. Also, in a signal wavelength band including S, C, and L bands, the absolute value of chromatic dispersion in the whole optical transmission line 1 is small.

Figure 15:
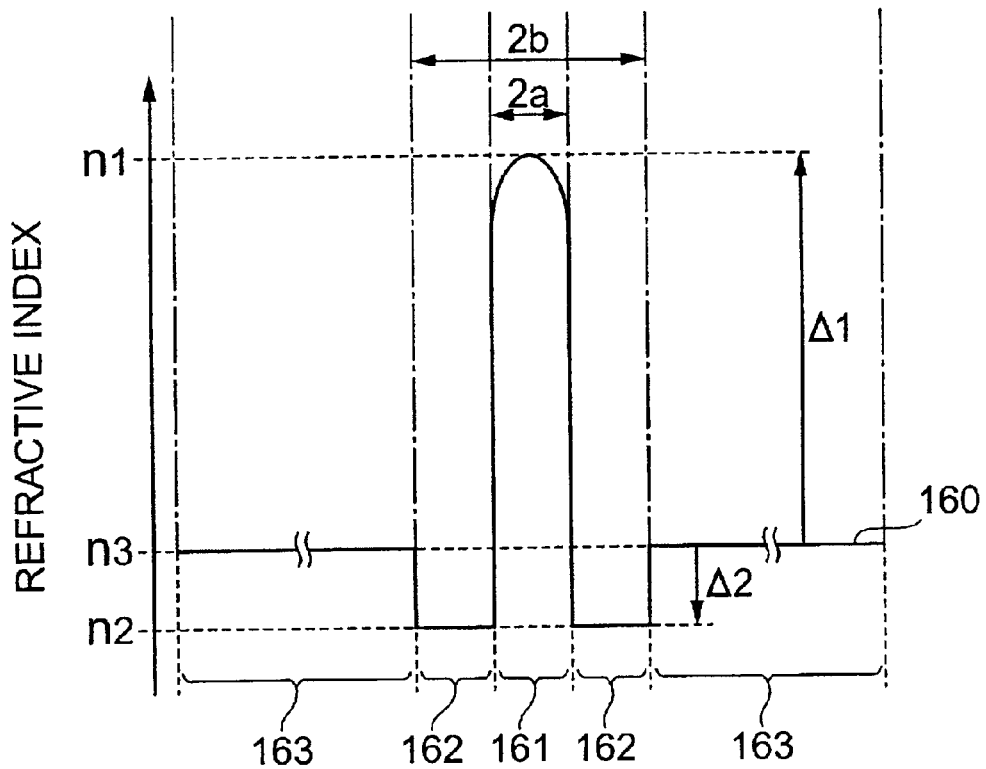
FIG. 15 is a refractive index profile of a dispersion-compensating optical fiber acting as a comparative example.

The dispersion-compensating optical fiber in accordance with a comparative example and an optical transmission line including the same will now be explained. FIG. 15 shows a refractive index profile 160 of this comparative example (dispersion-compensating optical fiber). The comparative example has a W-shaped refractive index profile 160 constituted by a core region with a refractive index n1 extending along a predetermined axis, a depressed region with a refractive index n2 (<n1) provided on the outer periphery of the core region, and an outer cladding region provided on the outer periphery of the depressed region. In the refractive index profile 160, areas 161, 162, and 163 indicate refractive indices of the core region, depressed region, and outer cladding region, respectively.

Figure 16:
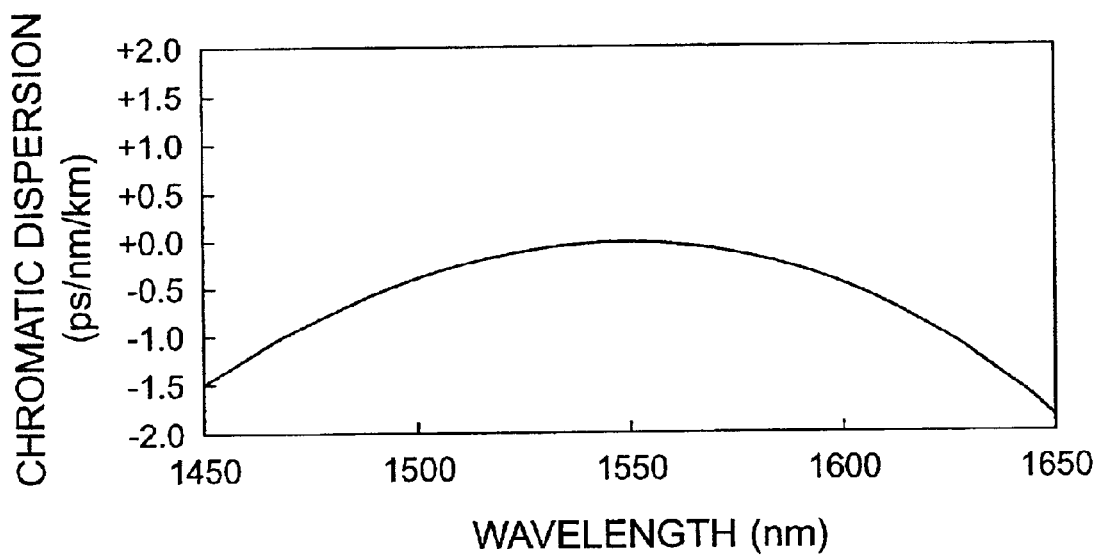
FIG. 16 is a graph showing the chromatic dispersion characteristic of an optical transmission line including the dispersion-compensating optical fiber acting as the comparative example shown in FIG. 15.

In the sample prepared as the comparative example, the core region has an outer diameter 2a, the depressed region has an outer diameter 2b, the relative refractive index difference Δ1 of the core region with respect to the outer cladding region is 1.6%, and the relative refractive index difference Δ2 of the depressed region with respect to the outer cladding region is −0.5%. Also, as characteristics at a wavelength of 1550 nm, the comparative example sample has a chromatic dispersion of −68.8 ps/nm/km, a dispersion slope of −0.21 ps/nm$^2$/km, a transmission loss of 0.27 dB/km, a figure of merit (|D|/L) of 255 ps/nm/dB, an effective area $A_{eff}$ of 19 $\mu$m$^2$, an MFD of 5.0 $\mu$m, and a PMD of 0.03 ps·km$^{-1/2}$. FIG. 16 is a graph showing the chromatic dispersion characteristic of an optical transmission line in which the comparative example sample (dispersion-compensating optical fiber) having the characteristics mentioned above and the single-mode optical fiber SMF2 are adjusted in terms of their lengths so as to yield a chromatic dispersion of 0 ps/nm/km at a wavelength of 1550 nm. The whole optical transmission line in which the comparative example sample is employed has a dispersion slope of −0.001 ps/nm$^2$/km at a wavelength of 1550 nm, a chromatic dispersion deviation of 1.46 ps/nm/km within the wavelength range of 1450 to 1620 nm, a chromatic dispersion deviation of 0.86 ps/nm/km within the wavelength range of 1480 to 1620 nm, and a chromatic dispersion deviation of 0.43 ps/nm/km within the wavelength range of 1500 to 1600 nm.

As can be seen from FIG. 16, it is difficult for the optical transmission line employing the comparative example having the W-shaped refractive index profile 160 to be designed such that maximum and minimum values of chromatic dispersion exist within the wavelength ranges of 1450 to 1530 nm and 1570 to 1620 nm, respectively. Also, its wavelength band is very hard to broaden.

Figure 17:
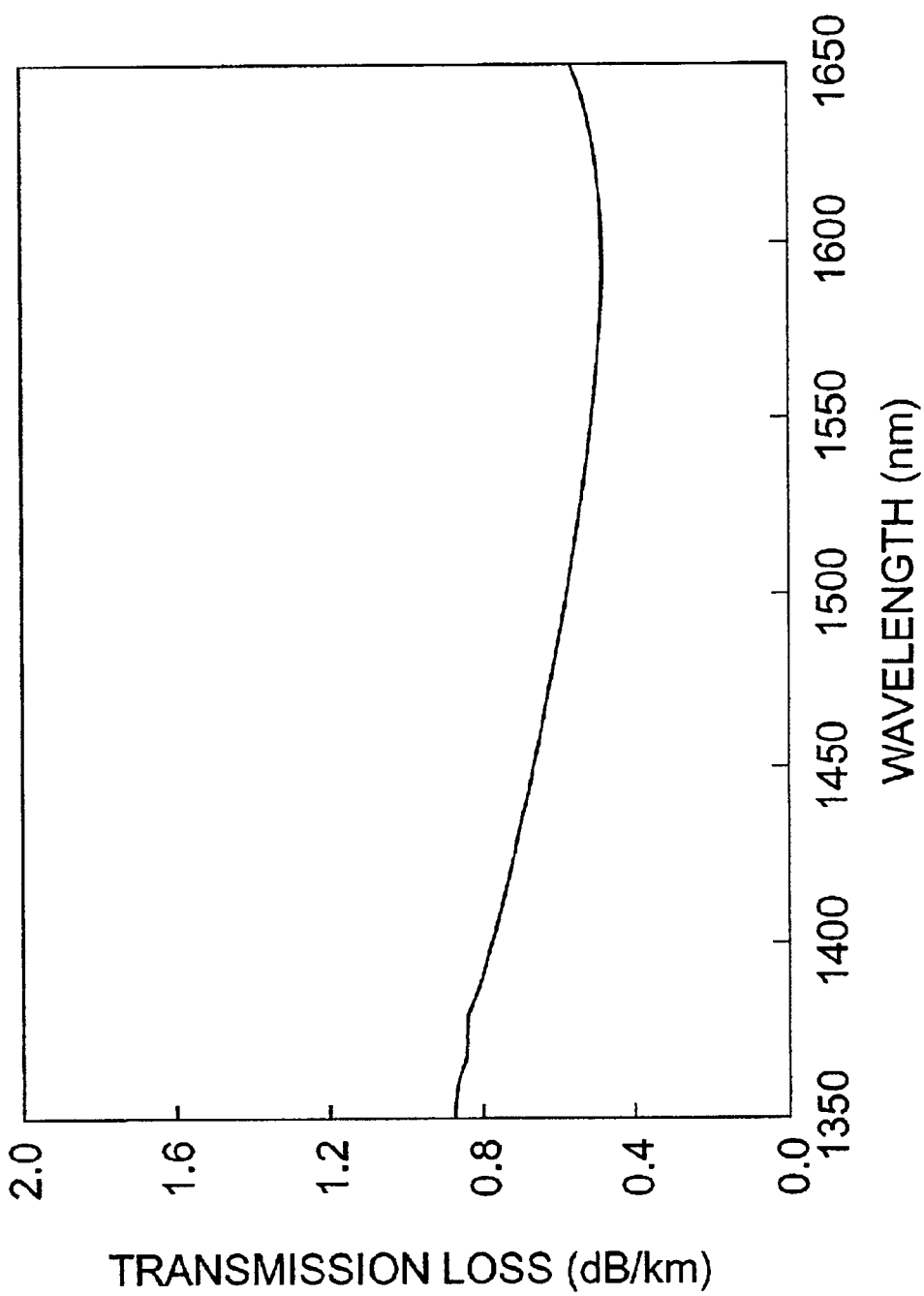
FIG. 17 is a graph showing the transmission loss characteristic of a dispersion compensating module obtained when sample DCF7 is modularized.

FIG. 17 is a graph showing the transmission loss characteristic of the dispersion-compensating optical fiber sample DCF7 employable in the optical transmission line 1 according to the present invention, which is obtained when the sample is modularized as shown in FIGS. 4A and 4B. Thus modularized sample DCF7 has a length of 10.3 km, whereas single-mode optical fibers are connected to both ends. Also, the sample DCF7 is wound at a diameter of 150 mm, and is accommodated in a packaging of 230×230×45 mm while in a state molded with a resin such that no stress is applied thereto. As can be seen from this graph (FIG. 17), the transmission loss of thus modularized sample DCF7 is low in a broad signal wavelength band. Also, its bending loss at a wavelength of 1620 nm in the longer wavelength range is small, whereas the transmission loss at a wavelength of 1620 nm is smaller than that at a wavelength of 1450 nm. As characteristics at a wavelength of 1550 nm, thus modularized sample DCF7 has an insertion loss of 6.16 dB, a splice loss to single-mode optical fiber of 0.40 dB per splice, a chromatic dispersion of −1640.8 ps/nm, a dispersion slope of −6.70 ps/nm$^2$, a figure of merit (|D|/L) of 266 ps/nm/dB, and a polarization mode dispersion (PMD) of 0.13 ps. The dispersion-compensating optical fiber DCF7 can compensate for a dispersion and dispersion slope of single-mode optical fiber having a length of 100 km.

The structure and refractive index profile of the dispersion-compensating optical fiber 12 employed in the optical transmission line according to the present invention are not restricted to those of FIGS. 10A and 10B. For example, it may comprise at least one additional depressed region or ridged region provided between the ridged region and outer cladding region.

Figure 18A:
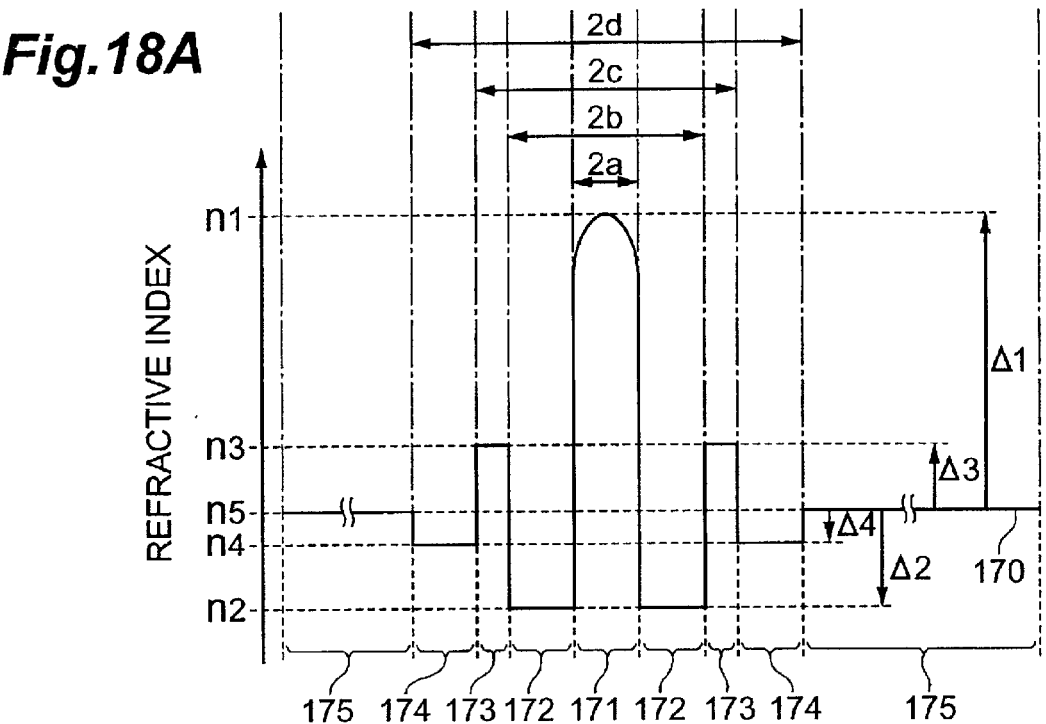
FIGS. 18A and 18B are other refractive index profiles of dispersion-compensating optical fibers employed in the optical transmission line according to the present invention.

For example, as shown in FIG. 18A, the dispersion-compensating optical fiber 12 may comprise a structure in which another depressed region is newly provided between the ridged region 123 and outer cladding region 124 in the structure shown in FIG. 10A. In this case, the dispersion-compensating optical fiber 12 comprises a core region extending along a predetermined axis, a first depressed region provided on the outer periphery of the core region, a ridged region provided on the outer periphery of the first depressed region, a second depressed region provided on the outer periphery of the ridged region, and an outer cladding region provided on the outer periphery of the second depressed region. The core region has a maximum refractive index n1 and an outer diameter 2a. The first depressed region has a minimum refractive index n2 (<n1) and an outer diameter 2b. The ridged region has a maximum refractive index n3 (>n2) and an outer diameter 2c. The second depressed region has a minimum refractive index n4 (<n3) and an outer diameter 2d. The outer cladding region has a maximum refractive index n5 (>n4). With reference to the outer cladding region, the core region has a relative refractive index difference of $\Delta 1$ $(=((n1)^2-(n5)^2)/2(n5)^2)$, the first depressed region has a relative refractive index difference of $\Delta 2$ $(=((n2)^2-(n5)^2)/2(n5)^2)$, the ridged region has a relative refractive index difference of $\Delta 3$ $(=((n3)^2-(n5)^2)/2(n5)^2)$, and the second depressed region has a relative refractive index difference of $\Delta 4$ $(=((n4)^2-(n5)^2)/2(n5)^2)$. In the refractive index profile 170 shown in FIG. 18A, areas 171, 172, 173, 174, and 175 show respective refractive indices of the core region (corresponding to each part within the core region along the line L in FIG. 10A), first depressed region, ridged region, second depressed region, and outer cladding region.

Figure 18B:
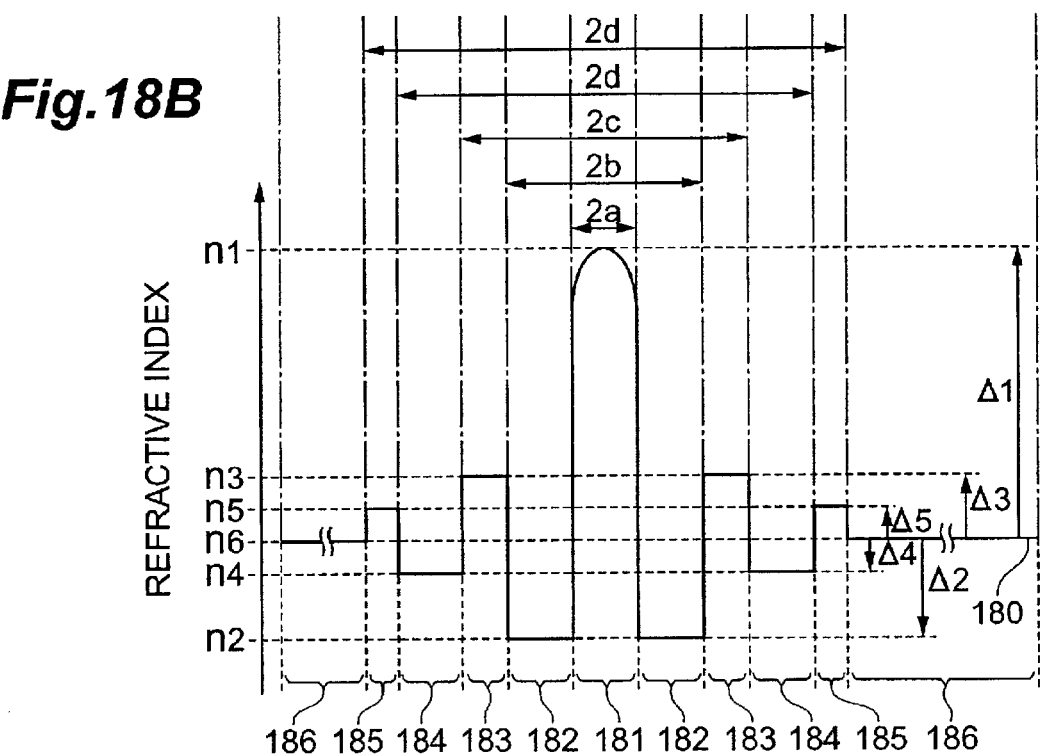

Further, as shown in FIG. 18B, the dispersion-compensating optical fiber 12 may have a structure in which additional depressed region and ridged region are newly provided between the ridged region 123 and outer cladding region 124 in the structure shown in FIG. 10A. In this case, the dispersion-compensating optical fiber 12 comprises a core region extending along a predetermined axis, a first depressed region provided on the outer periphery of the core region, a first ridged region provided on the outer periphery of the first depressed region, a second depressed region provided on the outer periphery of the first ridged region, a second ridged region provided on the outer periphery of the second depressed region, and an outer cladding region provided on the outer periphery of the second ridged region. The core region has a maximum refractive index n1 and an outer diameter 2a. The first depressed region has a minimum refractive index n2 (<n1) and an outer diameter 2b. The first ridged region has a maximum refractive index n3 (>n2) and an outer diameter 2c. The second depressed region has a minimum refractive index n4 (<n3) and an outer diameter 2d. The second ridged region has a maximum refractive index n5 (>n4) and an outer diameter 2e. The outer cladding region has a maximum refractive index n6 (<n5). With reference to the outer cladding region, the core region has a relative refractive index difference of $\Delta 1$ $(=((n1)^2-(n6)^2)/2(n6)^2)$, the first depressed region has a relative refractive index difference of $\Delta 2$ $(=((n2)^2-(n6)^2)/2(n6)^2)$, the first ridged region has a relative refractive index difference of $\Delta 3$ $(=((n3)^2-(n6)^2)/2(n6)^2)$, the second depressed region has a relative refractive index difference of $\Delta 4$ $(=((n4)^2-(n6)^2)/2(n6)^2)$, and the second ridged region has a maximum relative refractive index difference of $\Delta 5$ $(=((n5)^2-(n6)^2)/2(n6)^2)$. In the refractive index profile 180 shown in FIG. 18B, areas 181, 182, 183, 184, 185, and 186 show respective refractive indices of the core region (corresponding to each part within the core region along the line L in FIG. 10A), first depressed region, first ridged region, second depressed region, second ridged region, and outer cladding region.

As in the foregoing, the optical transmission line according to the present invention is constituted by a single-mode optical fiber having a zero-dispersion wavelength in the 1.3-μm wavelength band and a dispersion-compensating optical fiber for compensating for the chromatic dispersion of the single-mode optical fiber which are optically connected to each other. In such a configuration, the optical transmission line has, as its overall characteristics at a wavelength of 1550 nm, a chromatic dispersion with an absolute value of 4 ps/nm/km or less, and a dispersion slope of −0.015 ps/nm $^2$/km or more but less than 0 ps/nm$^2$/km. Further, in the optical transmission line, the maximum value of chromatic dispersion exists within the wavelength range of 1450 to 1530 nm, whereas the minimum value of chromatic dispersion exists within the wavelength range of 1570 to 1620 nm. As a consequence, the optical transmission line has a small absolute value of chromatic dispersion as a whole in a signal wavelength band includings, C, and L bands, thereby being able to effectively suppress the broadening in pulse of signal light (thus exhibiting an excellent transmission characteristic).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission line comprising a single-mode optical fiber having a positive chromatic dispersion in a 1.55-μm wavelength band, and a dispersion-compensating optical fiber for compensating for a chromatic dispersion of said single-mode optical fibers;

said optical transmission line having, as characteristics of said optical transmission line as a whole at a wavelength of 1550 nm, a chromatic dispersion with an absolute value of 4 ps/nm/km or less, and a dispersion slope of −0.015 ps/nm$^2$/km or more but less than 0 ps/nm$^2$/km;

wherein said chromatic dispersion has a maximum value within a wavelength range of 1450 to 1530 nm, and a minimum value within a wavelength range of 1570 to 1620 nm.

2. An optical transmission line according to claim 1, wherein said single-mode optical fiber has a zero-dispersion wavelength within a 1.3-μm wavelength band.

3. An optical transmission line according to claim 1, wherein said chromatic dispersion has a deviation of 1.2 ps/nm/km or less within a wavelength range of 1450 to 1620 nm.

4. An optical transmission line according to claim 1, wherein said chromatic dispersion has a deviation of 0.8 ps/nm/km or less within a wavelength range of 1450 to 1620 nm.

5. An optical transmission line according to claim 1, wherein said chromatic dispersion has a deviation of 0.7 ps/nm/km or less within a wavelength range of 1480 to 1620 nm.

6. An optical transmission line according to claim 1, wherein said chromatic dispersion has a deviation of 0.5 ps/nm/km or less within a wavelength range of 1480 to 1620 nm.

7. An optical transmission line according to claim 1, wherein said chromatic dispersion has a deviation of 0.4 ps/nm/km or less within a wavelength range having a width of 100 nm included in a wavelength range of 1450 to 1620 nm.

8. An optical transmission line according to claim 1, wherein said dispersion-compensating optical fiber amplifies signal light when pumping light is supplied thereto.

9. An optical transmission line according to claim 1, wherein said dispersion-compensating optical fiber has, as characteristics at a wavelength of 1550 nm, a chromatic dispersion of −200 ps/nm/km or more but −50 ps/nm/km or less, a figure of merit, defined by the ratio ($|D|/L$) of an absolute value of chromatic dispersion D to transmission loss L, of 200 ps/nm/dB or more, and a polarization mode dispersion of 0.3 ps·km$^{-1/2}$ or less.

10. An optical transmission line according to claim 1, wherein an increase in transmission loss of said dispersion-compensating optical fiber resulting from OH absorption near a wavelength of 1.38 μm is 0.2 dB/km or less.

11. An optical transmission line according to claim 1, wherein the transmission loss of said dispersion-compensating optical fiber at a wavelength of 1620 nm is smaller than that of said dispersion-compensating optical fiber at a wavelength of 1450 nm.

12. An optical transmission line according to claim 1, wherein said dispersion-compensating optical fiber is modularized by being wound like a coil and is accommodated in a packaging having a size of 250 mm×250 mm×50 mm or smaller; and wherein, in thus modularized state, said dispersion-compensating optical fiber has a cutoff wavelength of 1450 nm or shorter, a polarization mode dispersion of 0.3 ps·km$^{-1/2}$ or less at a wavelength of 1550 nm, and a transmission loss at a wavelength of 1620 nm smaller than that at a wavelength of 1450 nm.

13. An optical fiber employed in the optical transmission line according to claim 1, said optical fiber having a chromatic dispersion of less than zero as a characteristic at a wavelength of 1550 nm.

14. An optical fiber according to claim 13, said optical fiber comprising:

a core region, extending along a predetermined axis, having a maximum refractive index n1;

a depressed region, provided on an outer periphery of said core region, having a minimum refractive index n2 (<n1);

a ridged region, provided on at an outer periphery of said depressed region, having a maximum refractive index n3 (>n2); and an outer cladding region, provided on an outer periphery of said ridged region, having a maximum refractive index n4 (<n3).

15. A dispersion compensating module including the optical fiber according to claim 13, said optical fiber being wound like a coil.

* * * * *